(12) United States Patent
Meeks et al.

(10) Patent No.: US 8,478,705 B2
(45) Date of Patent: Jul. 2, 2013

(54) PORTABLE DATA MANAGEMENT USING RULE DEFINITIONS

(75) Inventors: David T Meeks, Ashland, MA (US); Yannick Saillet, Stuttgart (FR)

(73) Assignee: International Business Machines Corporation, Armonk, NY (US)

(*) Notice: Subject to any disclaimer, the term of this patent is extended or adjusted under 35 U.S.C. 154(b) by 582 days.

(21) Appl. No.: 12/688,570

(22) Filed: Jan. 15, 2010

(65) Prior Publication Data

US 2011/0178971 A1 Jul. 21, 2011

(51) Int. Cl.
*G06F 17/00* (2006.01)
*G06F 3/00* (2006.01)

(52) U.S. Cl.
USPC ............................................ 706/47; 715/700

(58) Field of Classification Search
None
See application file for complete search history.

(56) References Cited

U.S. PATENT DOCUMENTS

| | | |
|---|---|---|
| 5,392,390 A | 2/1995 | Crozier |
| 5,555,346 A | 9/1996 | Gross et al. |
| 5,561,793 A | 10/1996 | Bennett et al. |
| 5,586,025 A | 12/1996 | Tsuji et al. |
| 5,684,990 A | 11/1997 | Boothby |
| 5,729,665 A | 3/1998 | Gauthier |
| 5,761,671 A | 6/1998 | Blackman et al. |
| 5,802,253 A | 9/1998 | Gross et al. |
| 5,943,676 A | 8/1999 | Boothby |
| 5,966,717 A | 10/1999 | Sass |
| 6,029,160 A | 2/2000 | Cabrera et al. |
| 6,044,381 A | 3/2000 | Boothby et al. |
| 6,076,090 A | 6/2000 | Burroughs et al. |
| 6,154,748 A | 11/2000 | Gupta et al. |
| 6,230,157 B1 | 5/2001 | Malcolm et al. |
| 6,279,008 B1 | 8/2001 | Ng et al. |
| 6,301,584 B1 | 10/2001 | Ranger |
| 6,408,302 B1 | 6/2002 | Lee et al. |
| 6,460,048 B1 | 10/2002 | Teng et al. |
| 6,496,835 B2 | 12/2002 | Liu et al. |
| 6,609,133 B2 | 8/2003 | Ng et al. |

(Continued)

FOREIGN PATENT DOCUMENTS

| | | |
|---|---|---|
| EP | 0513653 A2 | 11/1992 |
| EP | 1798684 A1 | 6/2007 |
| JP | 2007279852 A | 10/2007 |
| WO | 0062191 | 10/2000 |

OTHER PUBLICATIONS http://www.xbrl.org/TaxonomyRecognition/US%20GAAP%202009/XBRLUS-USGAAP, "XBRL US Country Taxonomy 2009", pp. 1-2.

(Continued)

*Primary Examiner* — Alan Chen
(74) *Attorney, Agent, or Firm* — Susan Murray; Edell, Shapiro & Finnan, LLC (57) ABSTRACT

Embodiments for methods, systems, and computer program products for creating and managing a portable data rule using an electronic computing device are presented including: causing the electronic computing device to create a rule definition including, defining an expression by a user, where the expression defines a logic of a rule, causing the electronic computing device to parse the expression into a logical variable associated with the expression, causing the electronic computing device to identify the logical variable, and causing the electronic computing device to store the rule definition, where the rule definition includes the expression and the logical variable. In some embodiments, the causing the electronic computing device to identify the logical variable includes: causing the electronic computing device to return a name of the logical variable; and causing the electronic computing device to return an expected type of the logical variable.

20 Claims, 8 Drawing Sheets

U.S. PATENT DOCUMENTS

| | | |
|---|---|---|
| 7,039,898 B2 | 5/2006 | Shah |
| 7,043,492 B1 | 5/2006 | Neal |
| 7,069,269 B2 | 6/2006 | Morris |
| 7,437,471 B2 | 10/2008 | Hohmann et al. |
| 7,472,346 B2 | 12/2008 | Baelen |
| 7,536,409 B2 | 5/2009 | Barcia |
| 7,657,506 B2 | 2/2010 | Levin |
| 7,797,289 B2 | 9/2010 | Chan et al. |
| 7,814,045 B2 | 10/2010 | Hermann et al. |
| 7,921,110 B1 | 4/2011 | Ting et al. |
| 8,266,168 B2 | 9/2012 | Bayliss |
| 2001/0014890 A1 | 8/2001 | Liu et al. |
| 2002/0007482 A1 | 1/2002 | Cirne |
| 2002/0089681 A1 | 7/2002 | Gauthier |
| 2002/0143761 A1 | 10/2002 | Shimano |
| 2002/0143818 A1 | 10/2002 | Roberts et al. |
| 2003/0225742 A1 | 12/2003 | Tenner et al. |
| 2005/0091640 A1 | 4/2005 | McCollum et al. |
| 2005/0131771 A1 | 6/2005 | Tischer |
| 2005/0182777 A1 | 8/2005 | Block et al. |
| 2005/0197931 A1 | 9/2005 | Gupta |
| 2005/0283486 A1 | 12/2005 | Lauterbach et al. |
| 2006/0026127 A1 | 2/2006 | Bodlaender |
| 2006/0230025 A1 | 10/2006 | Baelen |
| 2006/0242181 A1 | 10/2006 | Mueller-Klingspor |
| 2007/0112827 A1 | 5/2007 | Dettinger et al. |
| 2007/0198910 A1 | 8/2007 | Jensen et al. |
| 2008/0140602 A1 | 6/2008 | Roth et al. |
| 2008/0177731 A1 | 7/2008 | Matsuzaki |
| 2008/0201172 A1 | 8/2008 | McNamar |
| 2008/0208855 A1 | 8/2008 | Lingenfelder |
| 2008/0275829 A1 | 11/2008 | Stull |
| 2009/0006282 A1 | 1/2009 | Roth et al. |
| 2009/0006283 A1 | 1/2009 | Labrie et al. |
| 2009/0006472 A1 | 1/2009 | Bush et al. |
| 2009/0019358 A1 | 1/2009 | Blake |
| 2009/0024551 A1 | 1/2009 | Agrawal et al. |
| 2009/0030754 A1 | 1/2009 | McNamar |
| 2009/0138789 A1 | 5/2009 | Tangen et al. |
| 2009/0287923 A1 | 11/2009 | Topalov et al. |
| 2010/0131526 A1 | 5/2010 | Sun et al. |
| 2011/0196621 A1 | 8/2011 | Huyse et al. |
| 2011/0225173 A1 | 9/2011 | Gulhane et al. |
| 2012/0066214 A1 | 3/2012 | Nelke et al. |
| 2012/0096434 A1 | 4/2012 | Rama |
| 2012/0158625 A1 | 6/2012 | Nelke et al. |
| 2012/0197836 A1 | 8/2012 | Meeks et al. |
| 2012/0216274 A1 | 8/2012 | Chauhan et al. |
| 2013/0031117 A1 | 1/2013 | Mandelstein et al. |

OTHER PUBLICATIONS http://www.xbrl.org/TaxonomyRecognition/US%20GAAP%202009/XBRLUS-USGAAP, "XRBL US Accountants' Report Taxonomy 2009", pp. 1-2.
http://www.xbrl.org/TaxonomyRecognition/US%20GAAP%202009/XBRLUS-USGAAP, "XBRL US GAAP Taxonomy 2009", pp. 1-2.
http://www.w3.org/TR/owl-parsing/ "OWL Web Ontology Language Parsing OWL in RDF/XML", W3C Working Group Note Jan. 21, 2004, pp. 1-20.
Pauvel Shvaiko et al., "Ontology Matching OM-2009", Papers from the ISWC Workshop, pp. 1-271.
PCT International Search Report and Written Opinion, PCT/EP2011/069332, Jan. 5, 2012, 12 pages.
Koch et al, "Policy Definitionn Language for Automated Management of Distributed Systems", (1996) IEEE 2nd Int'l of Distrib. Sys., pp. 55-64.
May, Wolfgang, "A Database-Based Service for Handling Logical Variable Bindings", Jan. 1, 2009, Institut fur Informatik, Gottingen, DE, 13 pp.
Computer Associates Int'l, Inc., "CleverPath Aion Business Rules Expert", (2004) Islandia, New York, Rules Guide r10, L00072-1E, 163 pp.
"International Search Report & Written Opinion", filed in counterpart Int'l App. No. PCT/EP2011/069332.
International Search Report and Written Opinion, PCT/EP2011/062074, Sep. 21, 2012, 16 pages.
Mason B. McDaniel, "An Algorithm for Content-Based Automated File Type Recognition, Master Thesis", James Madison University, www.forensicswiki.org/w/images/f/f9/Mcdaniel01.pdf Dec. 1, 2001, 105 pages.
International Search Report and Written Opinion, PCT/IB2012/053380, Nov. 15, 2012, 10 pages.
"Legacy Data Encapsulator", ip.com, Jun. 14, 2001, 3 pages.

PORTABLE DATA MANAGEMENT USING RULE DEFINITIONS

BACKGROUND

Data quality monitoring tools allow a user to define data rules describing conditions that data should fulfill to meet predefined quality standards or describing how data is transformed from a source to a target. A data rule is typically an expression describing a condition or a transformation that can involve one or more column or one or more variables. Data rules can be complex and usually use a language, such as SQL or a proprietary language to define the logic of the data rule. For example, a typical data rule expressions could be: "EMPLOYEE.AGE>0", specifying that the column AGE of the table EMPLOYEE must have positive values, or "EMPLOYEE.ID UNIQUE" specifying that each value in the column ID must be unique, or even more complex conditions, such as "IF CUSTOMERS.AGE<18 THEN CUSTOMERS.MARITAL_STATUS='child'" specifying that depending on the value of a specific column, the value of another column is constrained.

As may be seen, data rules are usually bound to the physical names of the sources upon which they operate. Thus, in existing solutions, the definition of the rule contains the name of the tables or columns upon which the rule is applied. In the example above, the data rule "EMPLOYEE.AGE>0" implies that the column being tested is a column named AGE contained in a table EMPLOYEE. In conventional solutions, data rules are not generally defined to be portable. That is, if a user decides to apply a given data rule on a different column, then the data rule needs to be redefined. Therefore, if a user wants to apply the original data rule, "EMPLOYEE.AGE>0," to a new column of data such as "PRODUCTS.WEIGHT," the user must redefine the original data rule to include the new location of the data. A new data rule—"PRODUCTS.WEIGHT>0"—must be created. Additionally, as may be appreciated, the new data rule is not related to the original data rule.

In like manner, if a user decides to apply the original data rule against a different value then the data rule needs to be redefined. Therefore, if a user wants to apply the original data rule, "EMPLOYEE.AGE>0," to a new value such as "65," the user must redefine the original data rule to include the new value. A new data rule—"EMPLOYEE.AGE>65," "—must be created. Additionally, as above, the new data rule is not related to the original data rule.

Therefore, systems and methods for portable data management are presented herein.

BRIEF SUMMARY

Embodiments for methods, systems, and computer program products for creating and managing a portable data rule using an electronic computing device are presented including: causing the electronic computing device to create a rule definition, the causing the electronic computing device to create the rule definition including, defining an expression by a user, where the expression defines a logic of a rule, causing the electronic computing device to parse the expression into a set or list of logical variables associated with the expression, causing the electronic computing device to identify the logical variable, and causing the electronic computing device to store the rule definition, where the rule definition includes the expression and the logical variable. In some embodiments, the causing the electronic computing device to identify the logical variable includes: causing the electronic computing device to return a name of the logical variable; and causing the electronic computing device to return an expected type of the logical variable. In some embodiments, the identifying the logical variable further includes: causing the electronic computing device to return a default binding target. In some embodiments, method further includes: before the causing the electronic computing device to store the rule definition, validating the rule definition, the validating the rule definition including, creating a temporary rule executable, executing the temporary rule executable, and if the executing the temporary rule executable is not valid, returning to the defining the expression by the user. In some embodiments, the temporary rule executable includes: a reference to a rule definition; a temporary binding list, where the temporary binding list includes, a temporary name of the logical variable, a temporary type of the logical variable, and a temporary binding target of the logical variable. In some embodiments, the rule executable includes: a reference to a rule definition; a binding list, where the binding list includes, the name of the logical variable, a type of the logical variable, and a binding target for the logical variable.

The foregoing presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
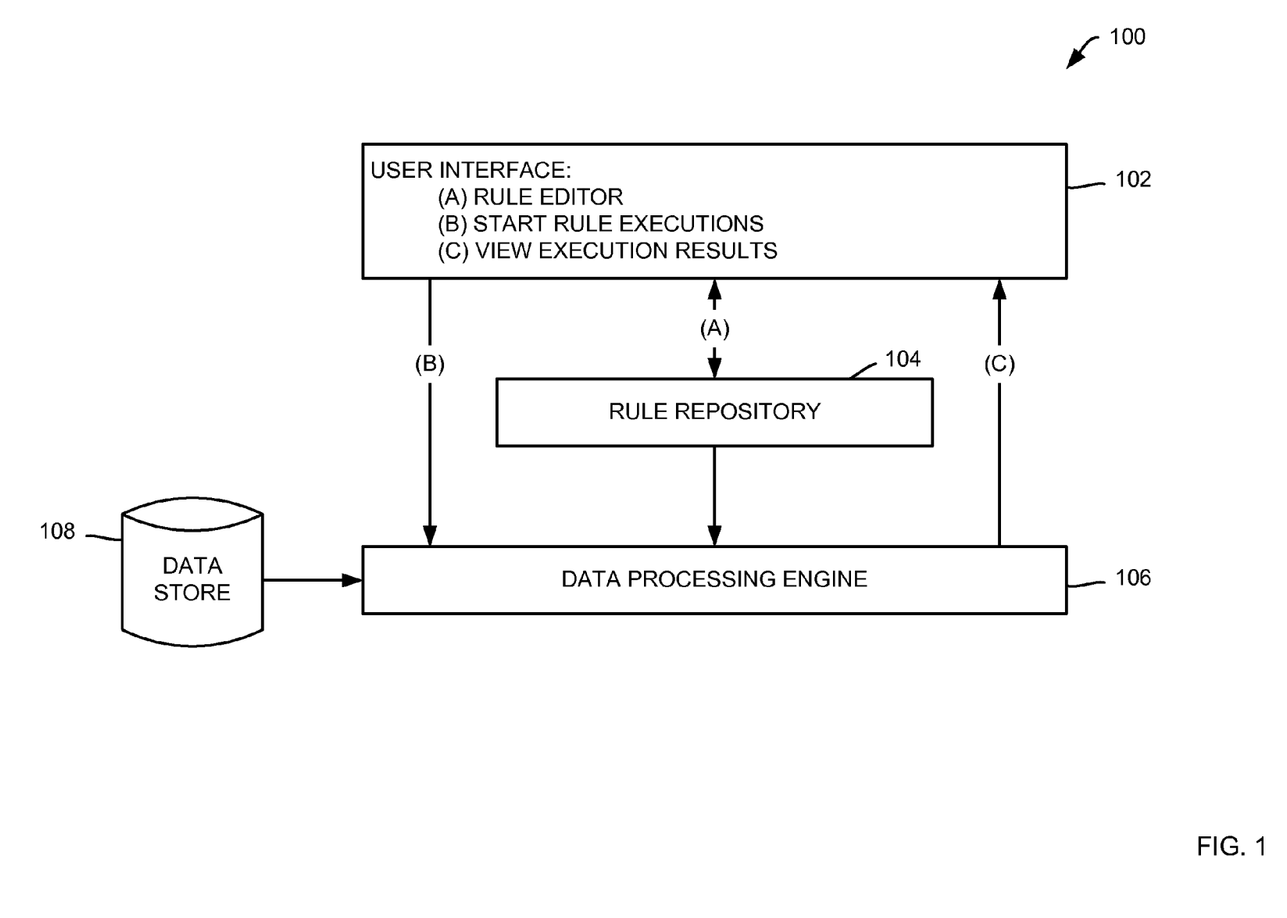
FIG. 1 is an illustrative representation of an architecture for managing portable data rules in accordance with embodiments of the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions, FIG. 1 is an illustrative representation of architecture 100 for managing portable data rules in accordance with embodiments of the present invention. As illustrated, user interface 102 may be utilized for managing I/O functions of the system. In some embodiments, a user interface may be utilized for a number of functions. For example, in embodiments, a rule editor may be configured for defining any number of rule definitions. Utilizing a rule editor, a user may create or define a rule definition and access an existing rule definition in embodiments. When accessing an existing rule definition, a user may additionally modify an existing rule definition in embodiments. Rule definitions will be discussed in further detail below for FIG. 2. As illustrated, user interface 102, via a rule editor, may be in communication with rule repository 104. In embodiments, a rule repository may be utilized for storing any number of rule definitions.

In embodiments, user interface 102 may be utilized to start rule executables. Rule executables, in turn, may be generated and executed on data processing engine 106. Rule executables will be discussed in further detail below for FIG. 3. In other embodiments, user interface 102 may be utilized to view execution results. As illustrated, data processing engine 106 may be in communication with user interface 102 and rule repository 104. Data processing engine 106 may be in further communication with data store 108, which may be configured for storing data upon which a rule executable operates. In embodiments, data processing engine 106 may be further configured to store statistics associated with data processing events. These statistics may be displayed on user interface 102 in any manner known in the art without departing from the present invention.

Figure 2:
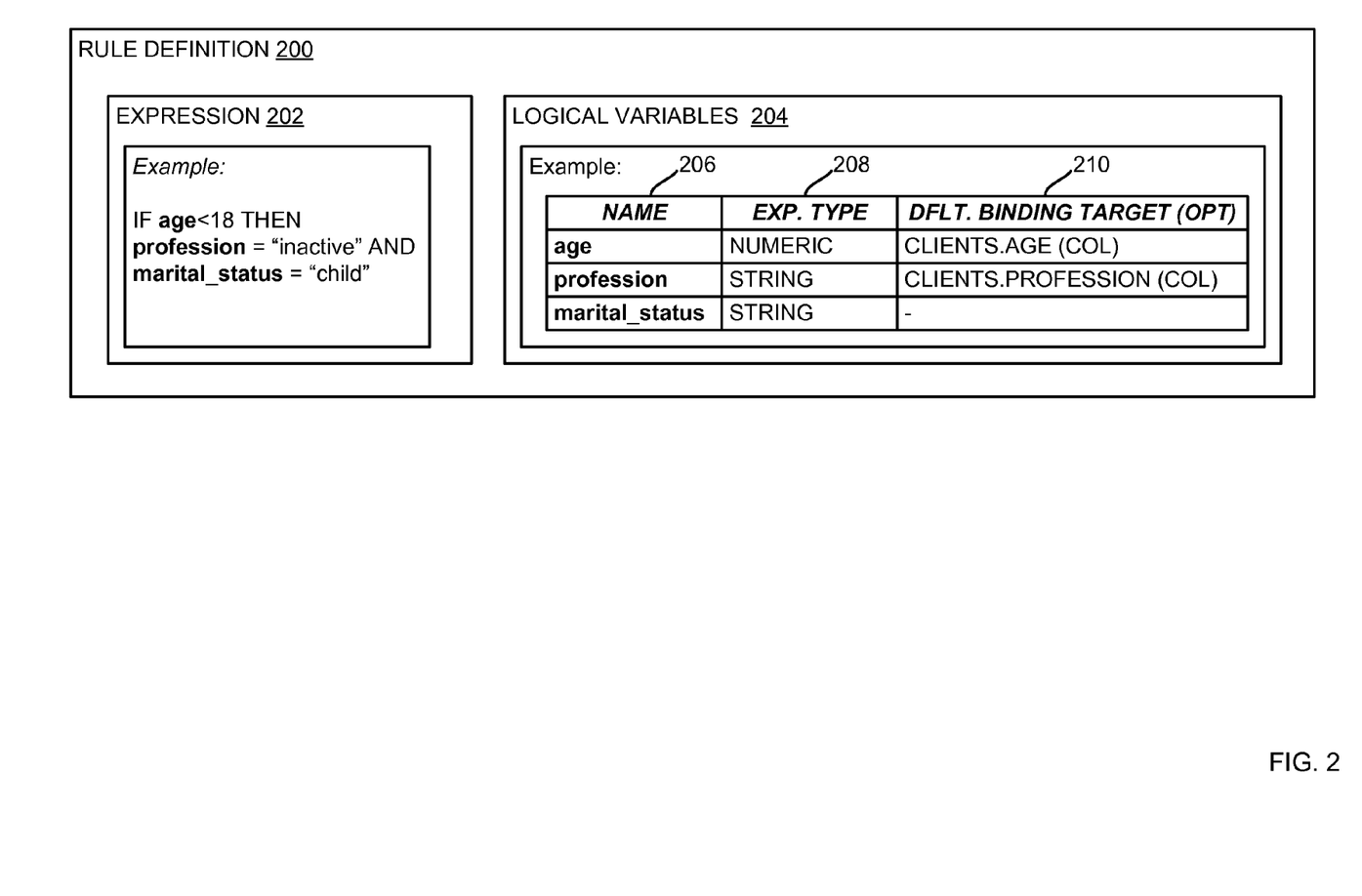
FIG. 2 is an illustrative representation of a logical structure for a rule definition in accordance with embodiments of the present invention.

FIG. 2 is an illustrative representation of a logical structure for rule definition 200 in accordance with embodiments of the present invention. As utilized herein, a rule definition includes a logical definition of a rule without any assumption as to a physical source or particular location where the rule may be applied. For example, typically, a rule might be written in the following manner:

EMPLOYEE.AGE>0

In this example, the rule is tied to a particular location. That is, "EMPLOYEE.AGE" resolves the rule to a column "AGE" for a table named "EMPLOYEE." To eliminate references to a particular location, a rule definition may be written in the following manner:

age>0

In this example, the rule is not tied to a particular location. Rather, "age," in this example, is a logical variable. In some examples, an even more generic rule may be written such as "age>max_age," where both "age" and "max_age" are logical variables. Returning to FIG. 2, rule definition 200 as contemplated herein includes expression 202 and logical variables 204. As illustrated, expression 202 includes logic having a number of logical variables. In embodiments, any number of logical variables may be utilized without departing from the present invention. In this example, the following expression is illustrated:

IF age<18 THEN profession="inactive" AND marital_status="child"

Thus, from expression 202, rule definition 200 includes logical variables 204 identified and listed as age, profession, and marital_status. When a user creates or modifies a rule definition, the user may utilize a rule editor to modify an expression. A rule editor used to edit the expression of a rule definition can be a simple text editor to edit the rule as a plain text expression, or a more complex editor allowing the user to drag and drop physical columns on the expressions without departing from embodiments provided herein. When a user incorporates physical columns to build a rule, those physical columns may be automatically transformed from the expression into pure logical variables, while the reference to the column itself can be automatically stored in the preferred binding of the variable to facilitate the creation of an executable rule later. Once an expression is saved, the system parses the expression and extracts a list of the logical variables contained in it.

Identified logical variables may be listed and include name 206, expected type 208, and optionally, default binding target 210. Name 206 may be generally identified from expression 202. Expected type 208 may be utilized to indicate the type of variable (i.e. numeric, string, etc.) expected for a corresponding logical variable. An expected type of each logical variable may be guessed by the system from the context of the expression (for instance "age>0" implies that age must be numeric, since it is compared to a numerical value). However, in some embodiments, the type of variable may not have a standard expected type. In those embodiments, an expected type may be "ANY." An "ANY" designation indicates that the field is effectively typeless or untyped. Thus, typed and untyped fields may be supported in embodiments provided herein. Default binding target 210 may be utilized to identify a previously designated default location where a logical variable may be found. In embodiments, default binding targets may be previously defined by a user or administrator, or may be defined from binding historical data.

It may be appreciated that a rule definition, as contemplated herein, is not an executable rule. That is, a rule definition is a logical representation of rule logic without reference to an actual physical binding. Actual physical binding is handled by a rule executable discussed in further detail below. Further, since lists of logical variables used by the rule definition may be summarized in a separate list, the list can be retrieved easily by the system or any other component without having to parse the logic of the expression.

Figure 3:
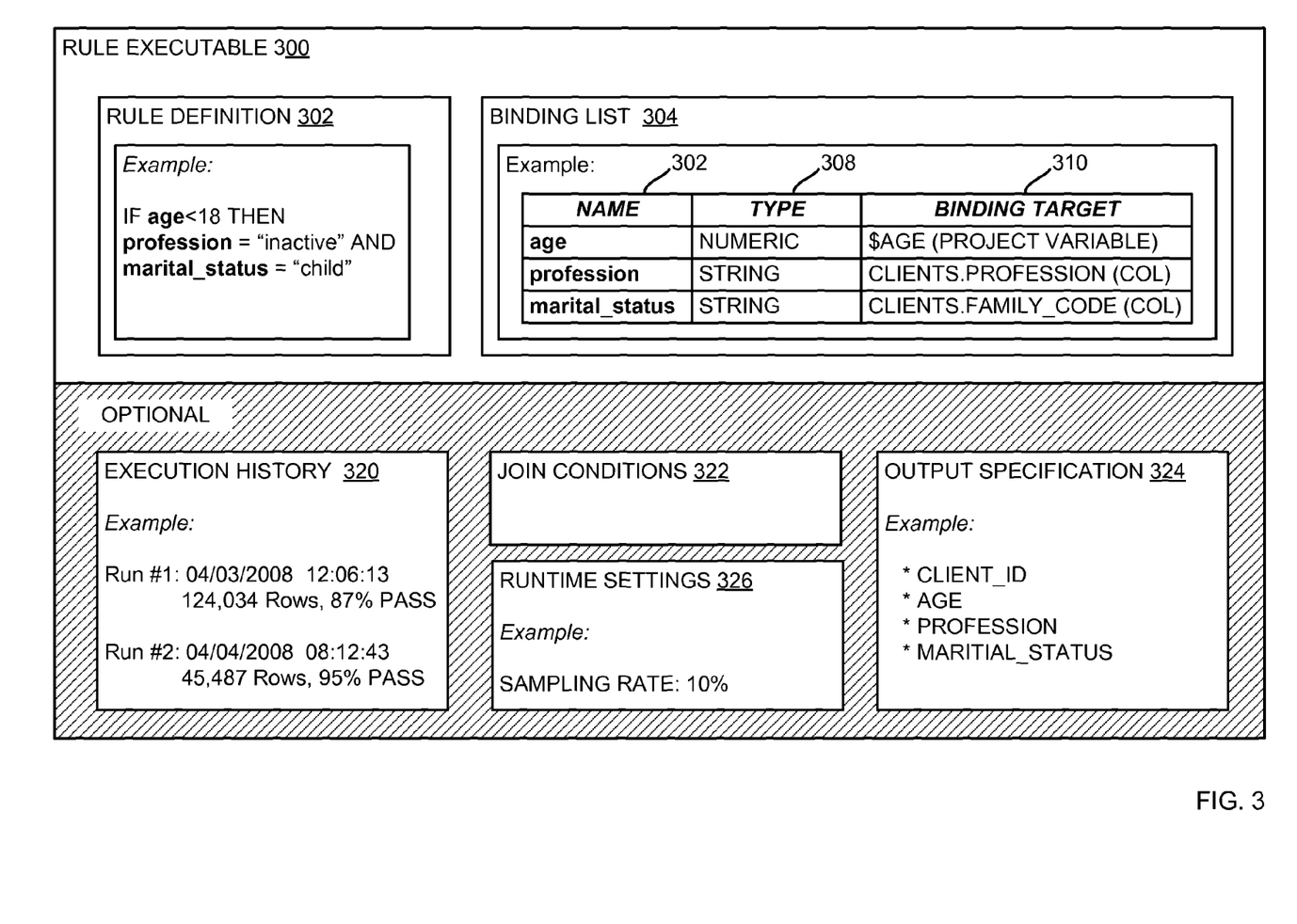
FIG. 3 is an illustrative representation of a logical structure for a rule executable in accordance with embodiments of the present invention.

FIG. 3 is an illustrative representation of a logical structure for a rule executable 300 in accordance with embodiments of the present invention. As utilized herein, a rule executable is a specific implementation of a rule definition. A rule executable references a logical rule definition and defines binding targets between each logical variable used in the definition and the physical columns or tables where the rule should be applied. In some embodiments, logical variables may be constants. At least one difference over prior art solutions is that a rule definition, as utilized herein, is not a rule that is executable. A rule definition embodiment is a pure logical representation of the logic of the rule. On the other hand, a rule executable, as utilized herein, references a rule definition to make a rule definition executable by defining the physical bindings. Physical bindings (i.e. binding targets) indicate which physical artifact must be used for each logical variable during execution. A rule executable cannot modify or override the logic of the rule, which is defined in the rule definition only. As such, in some embodiments, several rule executables may be utilized with different bindings for the same rule definition.

As illustrated, rule executable 300 includes a rule definition reference 302. Rule definition reference 302 is a pure reference to a rule definition and not merely a copy of the rule definition. Therefore rule executable 300 cannot override the logic of the rule. As such, if a rule definition is changed, the change impacts each rule executable referencing the rule definition. Rule executable 300 further includes binding list 304 for each logical variable (see FIG. 2, 204) defined in rule definition 200. Identified logical variables may be listed and include name 306, type 308, and binding target 310. Binding target 310 may be utilized to identify a previously designated default location where the logical variable may be found. In embodiments, default binding targets may be previously defined by a user or administrator or may be defined from binding historical data. The binding of each logical variable must be fully defined before the rule executable becomes executable. In embodiments, logical variables may be bound to a physical column, a physical table, a constant, a project variable, and a system variable without limitation and without departing from the present invention. In an example of a physical table or column, a logical variable in an expression may be replaced by a value of a column for an analyzed row at execution time. In an example of a constant, a logical variable in an expression may be replaced by a value of the constant at execution time. In an example of a system or project variable, a logical variable in an expression may be replaced by a value of the system or project variables. In some embodiments, system or project variables are also logical variables which are managed centrally at project or at system level (similar to environment variables for an operating system).

In some embodiments, rule executable 300 may further include output specification 324 for determining how an output is presented. Output specifications may provide, for example, a list of columns or variables to include in an output. In some embodiments, rule executable 300 may include join conditions 322 for presenting how a binding target is utilized to join one or more tables during execution of the rule executable. Join conditions provide information regarding how different tables used in a binding must be joined together to form one data set. For example, in embodiments, join conditions may include a list of key pairs to use to join different tables. In some embodiments, more than one join condition may be required. In other embodiments, no join conditions may be required. In some embodiments, rule executable 300 may further include runtime settings for determining how the rule executable will access the data store. For example, in embodiments, runtime settings may provide a sampling rate to apply on a data store.

In some embodiments, rule executable 300 may further include execution history 320 for logging statistics of the execution of the rule executable. Storing execution history in a rule executable may be useful for trend analysis or for audits. In embodiments, statistics may include without limitation: a run number, a run start date, a run start time, a run row information, a run row pass percentage, a run ID, a user name, a run duration, a total number of analyzed rows, and a variance to a predefined benchmark. In general, a benchmark is a condition defined by a user to specify when a whole data set or execution run should be considered as valid or not. An example of a benchmark could be: 95% of the rows must pass the rule. That is, the benchmark defines a tolerance of 5% failures, before the data source or run is classified as "bad." Benchmark definitions may be saved as part of a rule definition or as part of an executable rule in embodiments. Benchmarks allow a system to take automatic actions when a complete run doesn't match the benchmark. Actions may include, for example, notifying a user or aborting a job that is supposed to load the data. If such a benchmark is defined in embodiments, run statistics may include a variance to a pre-defined benchmark.

For embodiments utilizing rule sets (where more than one rule is tested against each record), statistics may include a rule set record pass percentage, a rule set row pass percentage, a rule set standard deviation, a rule set row per rule pass percentage for providing a percentage of rows that passed or failed each rule composing a rule set, a rule set row rule fail rate for providing the number of percentage of rows that failed n rules of a rule set, a rule set rule association statistic for describing what groups rules composing a rule set are failed by the same record (e.g. rules of type: rule 1 and rule 3 are failed together by 35% of the rows. If a row fails rule 1, it will fail rule 3 with a probability of 65%), and a rule set row detail result for providing a name of the rules failed by each tested row (under the form of a table containing a row ID, and a list of violated rules).

As may be appreciated, data rules can include any number of different types. In one embodiment, one type of data rule can be a simple rule represented by an expression as presented on FIG. 2. Different types of data rules using different technologies can be however used without changing the concept of rule definition versus rule executable and without departing from embodiments herein. For instance, a learning machine that computes a predictive model or a neuronal network may utilize benefits provided herein to predict or validate events, instead of using hand-written expressions. When seen from outside, the structure of a rule definition as presented in FIG. 2 may equally apply. Such a data rule would still have a definition that would be a model or a matrix, instead of an expression (202), and a list of input variables (204) to bind. The concept of logical variables to bind and executables is independent from the technology and the type of data rules used.

Figure 4:
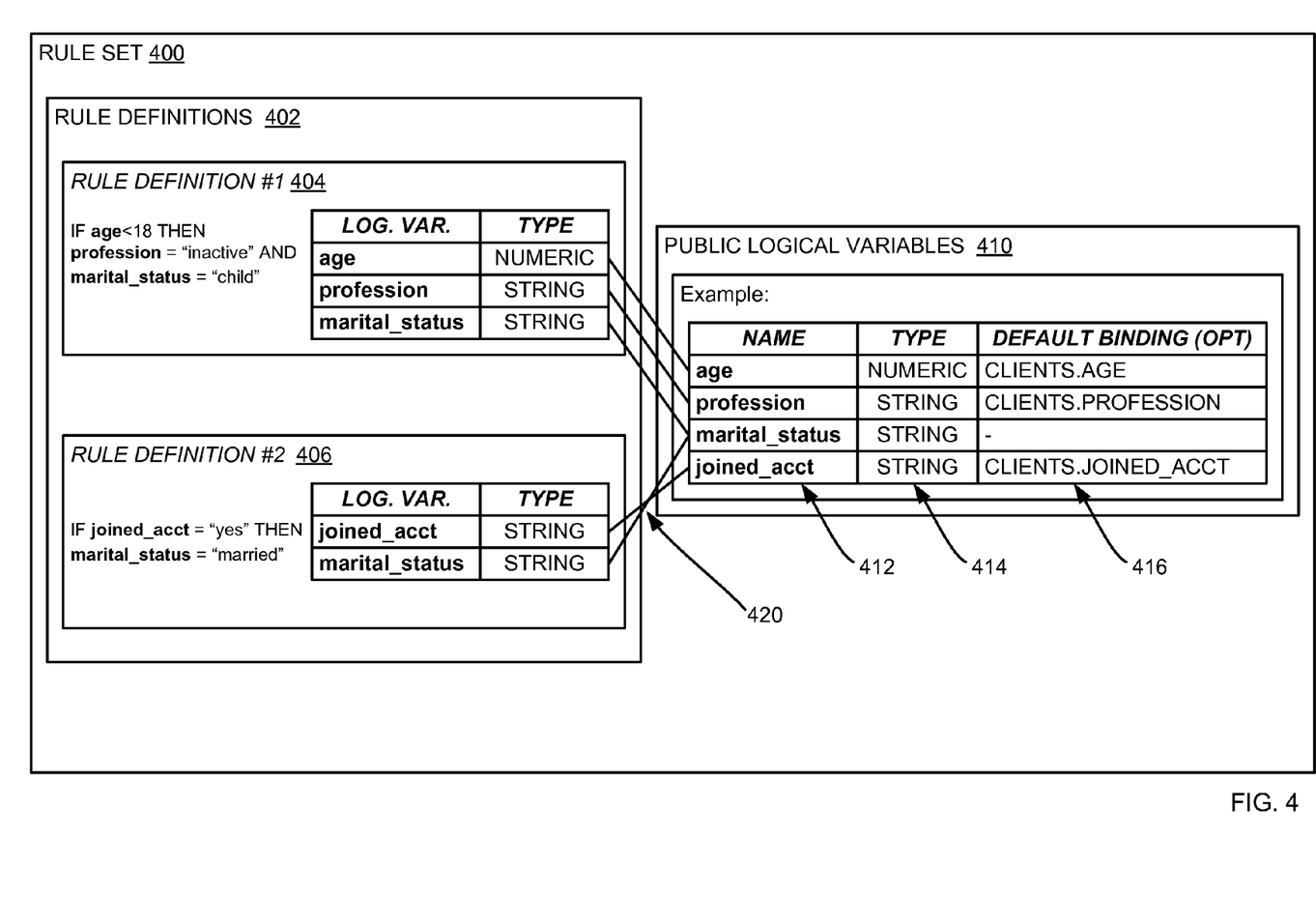
FIG. 4 is an illustrative representation of a logical structure for a rule set in accordance with embodiments of the present invention.

FIG. 4 is an illustrative representation of a logical structure for a rule set 400 in accordance with embodiments of the present invention. As utilized herein, a rule set is made up of a collection of several data rules. As illustrated, rule set 400 includes a number of rule definitions 402. Each rule definition has been created separately and has been stored in a rule repository as a stand-alone rule definition. The rule set only references them. Therefore the logic of the rule is defined by referencing a list of rule definitions which will be executed together in the same transaction. Each rule definition referenced, 404 and 406, includes a list of logical variables to bind. In the example presented, the first rule definition 402 of rule set 400 includes three logical variables—age, profession, and marital_status. The second rule definition 406 has two logical variables—joined_acct and marital_status. These logical variables are private to the rule definitions composing the rule set and are, therefore, not visible outside the rule set. To make the private variables public, a rule set creates a public logical variable list 410 of public logical variables by listing all of the private logical variables of all internal rule definitions into one consistent set of public logical variables. In the example illustrated, the five private logical variables from the rule definitions 404 and 406 result in public logical variable list 410 of four public logical variables, because the two internal rule definitions utilize the same variable, "marital_status." Each of these public logical variables is bound internally 420 to at least one variable of at least one rule definition composing the rule set. An expected public type 414 of a public logical variable must be compatible with the expected type of the internal (and private) logical variable to which it may be connected. Rule set 400 may optionally include public default binding target 416. In some embodiments, there may be fewer public logical variables than private variables, since each public logical variable need only be internally bound to at least one private variable. But there cannot be more public logical variables than private logical variables, since; at most, one public logical variable can be bound to each private logical variable.

Note that the strategy of how a public logical variable list is created from private logical variables of the internal rule definitions can be customizable. In some embodiments, one might assume that variables of same name coming from different rule definitions are the same variable. In some embodiments, one could assume that variables coming from different rules definitions should be treated as different variables to bind separately, even if they have the same name. In other embodiments, a user may modify a list of public logical variables manually, by grouping separate variables together or by splitting grouped variables into separate variables. As stated above, a rule set is simply another type of logical rule, where rule expressions are replaced by a list of referenced rule definitions and an internal mapping table (i.e. binding list). However, a public logical variable list would appear substantially the same as with a rule definition so that an executable could be created on a rule set in the same way an executable is created on a rule definition. In addition, in embodiments, a rule set can contain different rules of different types. That is, a rule set is not limited to expression based rules only, but could also contain other rule sets, or rules of other types.

Figure 5:
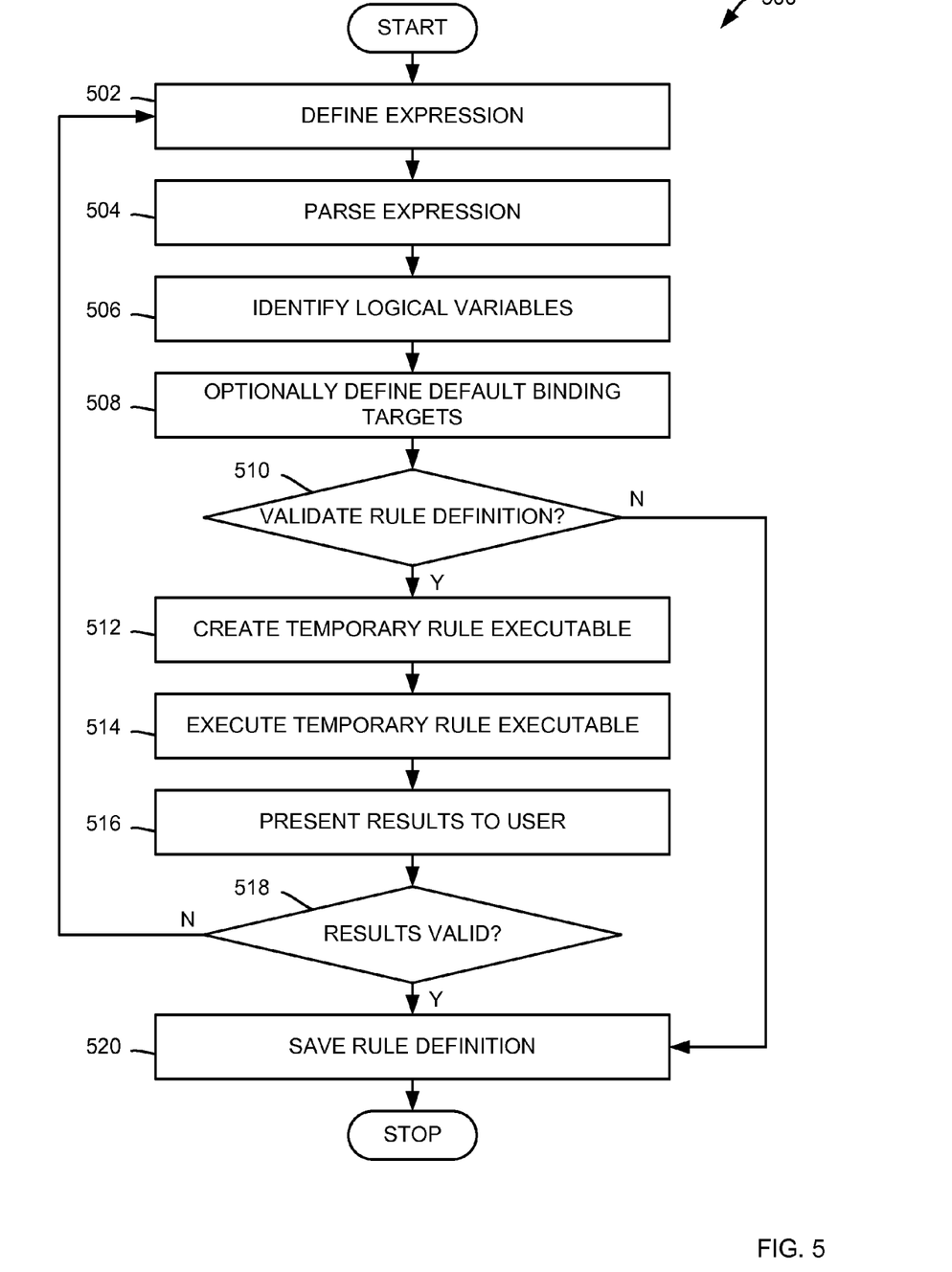
FIG. 5 is an illustrative flowchart of methods for creating a rule definition in accordance with embodiments of the present invention.

FIG. 5 is an illustrative flowchart 500 of methods for creating a rule definition in accordance with embodiments of the present invention. As utilized herein, a rule definition contains a logical definition of a rule without any assumption as to any physical source where the rule could be applied. When a user creates or modifies a rule definition, the user may utilize a rule editor to modify an expression. A rule editor used to edit the expression of a rule definition can be a simple text editor to edit the rule as a plain text expression, or a more complex editor allowing the user to drag and drop physical columns on the expressions without departing from embodiments provided herein. When a user incorporates physical columns to build a rule, those physical columns may be automatically transformed from the expression into pure logical variables, while the reference to the column itself can be automatically stored in the preferred binding of the variable to facilitate the creation of an executable rule later. Once an expression is saved, the system parses the expression and extracts a list of the logical variables contained in it.

Thus, at a first step 502, a user defines an expression where the expression defines logic of a rule. In an embodiment, defining an expression may be accomplished utilizing a rule editor. In addition, in embodiments, a rule may be selected from a list of rules. In other embodiments, an existing rule may be modified. At a next step 504, the method parses the expression. Parsing returns a list of elements such as a logical variable associated with an expression that may be analyzed for further use. At a next step 506, the method identifies any logical variables. In embodiments, any number of logical variables may be identified without departing from the present invention. In identifying logical variables, the method may, in some embodiments, return names of the logical variables and return an expected type of the logical variables. An expected type may be utilized to indicate the type of variable (i.e. numeric, string, etc.) expected for a corresponding logical variable. However, in some embodiments, the type of variable may not have a type. In those embodiments, a type may be "ANY." An "ANY" designation indicates that the field is effectively typeless or untyped. Thus, typed and untyped fields may be supported in embodiments provided herein. At a next step 508, the method optionally defines default binding targets. Default binding targets may be utilized to identify a previously designated default location where a logical variable may be found. In embodiments, default binding targets may be previously defined by a user or administrator, or may be defined from binding historical data.

At a next step 510, the method determines whether to validate a created rule definition. If the method determines at a step 510 not to validate the created rule definition, the method continues to a step 520 to save the rule definition to a rule repository, whereupon the method ends. If the method determines at a step 510 to validate the created rule definition, the method continues to a step 512 to create a temporary rule executable which may, in some embodiments be configured for operating on a representative data sample or a fictitious data sample. Creating a rule executable will be discussed in further detail below for FIG. 5. In short, a temporary rule executable includes a temporary reference to at least one rule definition and a temporary binding list. The temporary binding list may include a temporary name of the logical variable, a temporary type of the logical variable and a temporary binding target of the logical variable.

At a next step 514, the method executes the temporary rule executable. At a next step 516, the method presents results to a user. In some embodiments, results may be presented via a user interface. In other embodiments, results may be logged to a file. At a next step 518, the method determines whether results are valid. If the method determines at a step 518 that results are valid, the method continues to a step 520 to save the rule definition to a rule repository whereupon the method ends. If the method determines at a step 518 that results are not valid, the method continues to a step 502 to define an expression where the expression defines logic of a rule. In this manner, data rules may be tested and corrected before actual deployment.

Figure 6:
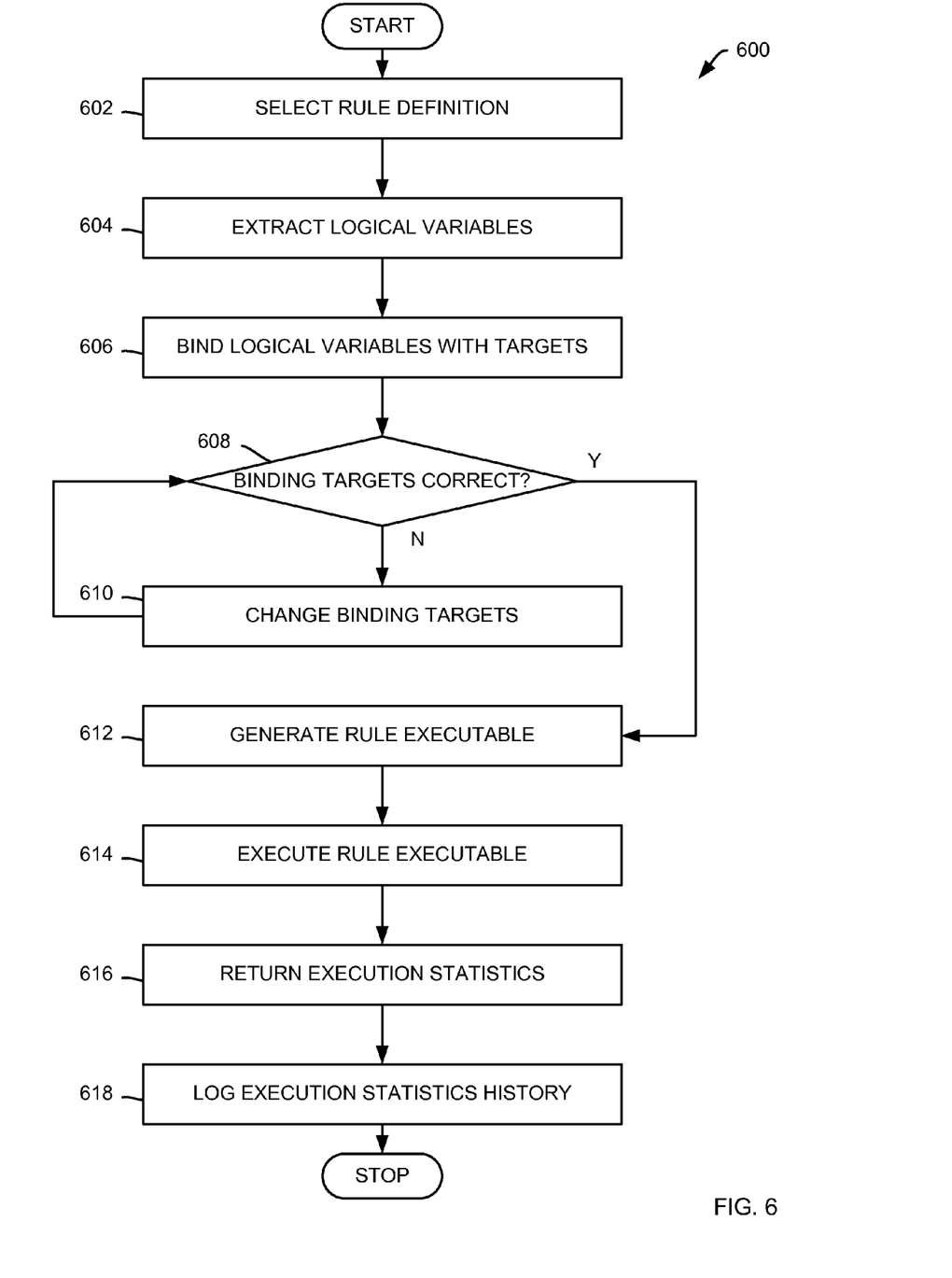
FIG. 6 is an illustrative flowchart of methods for managing a rule executable in accordance with embodiments of the present invention.

FIG. 6 is an illustrative flowchart 600 of methods for managing a rule executable in accordance with embodiments of the present invention. As noted above, a rule executable is a specific implementation of a rule definition. A rule executable references a logical rule definition and defines binding targets between each logical variable used in the definition and the physical columns or tables where the rule should be applied. In some embodiments, logical variables may be constants. At least one difference over prior art solutions is that a rule definition, as utilized herein, is not a rule that is executable. A rule definition embodiment is a pure logical representation of the logic of the rule. On the other hand, a rule executable, as utilized herein, references a rule definition to make a rule definition executable by defining the physical bindings. Physical bindings (i.e. binding targets) indicate which physical artifact must be used for each logical variable during execution. A rule executable cannot modify or override the logic of the rule, which is defined in the rule definition only. As such, in some embodiments, several rule executables may be utilized with different bindings for the same rule definition.

Thus, at a first step 602, a rule definition is selected. In some embodiments, rule definitions may be selected from a rule repository. Any number or type of rule definition may be selected without departing from embodiments presented herein. At a next step 604, the method extracts all logical variables from one or more corresponding rule definitions. As noted above, logical variables are associated with an expression that was previously parsed (see 504, FIG. 5). At a next step 606, logical variables are bound with targets. Initially, default binding targets may be extracted from rule definitions. At a next step 608, the method determines whether binding targets are correct. If the method determines that binding targets are correct at a step 608, the method continues to a step 612 to generate a rule executable. If the method determines that bindings are not correct at a step 608, the method continues to a step 610 to change bindings, whereupon the method continues to a step 608. In embodiments, changing bindings includes: creating a new target binding, selecting a default target binding, and modifying an existing target binding without limitation. The method may continue to iterate until binding targets are correct.

At a next step 612, the method generates a rule executable. As may be appreciated, in embodiments, a rule executable is a physical implementation of a rule definition. In embodiments, a rule executable includes: a reference to at least one rule definition and a binding list. In some embodiments, the binding list includes: the names of all logical variables, types of all logical variables, and binding targets for all logical variables. In some embodiments, a rule executable may further include an output specification for determining how an output is presented. Output specifications may provide, for example, a list of columns or variables to include in an output. In some embodiments, a rule executable may include join conditions for presenting how the binding target is utilized to join a plurality of tables during an execution of the rule executable. Join conditions provide information regarding how different tables used in a binding must be joined together to form one data set. For example, in embodiments, join conditions may include a list of key pairs to use to join different tables. In some embodiments, more than one join condition may be required. In other embodiments, no join conditions may be required. In some embodiments, a rule executable may further include runtime settings for determining how the rule executable will access the data store. For example, in embodiments, runtime settings may provide a sampling rate to apply on data stores. In some embodiments, the rule executable may further include execution history for logging statistics of the execution of the rule executable.

At a next step 614, the method executes a rule executable. Execution of the rule executable joins expressions with data. At a next step, the method returns execution statistics which may be logged at a step 618, whereupon the method ends. As noted above, storing or logging execution history in a rule executable may be useful for trend analysis or for audits. In embodiments, statistics may include without limitation: a run number, a run start date, a run start time, a run row information, a run row pass percentage, a run ID, a user name, a run duration, a total number of analyzed rows, and a variance to a predefined benchmark. In general, a benchmark is a condition defined by a user to specify when a whole data set or execution run should be considered as valid or not. An example of benchmark could be: 95% of the rows must pass the rule. That is, the benchmark defines a tolerance of 5% failures, before the data source or run is classified as "bad:" Benchmark definitions may be saved as part of a rule definition or as part of an executable rule in embodiments. Benchmarks allow a system to take automatic actions when a complete run doesn't match the benchmark. Actions may include, for example, notify a user or abort a job that is supposed to load the data. If such a benchmark is defined in embodiments, run statistics may include a variance to a pre-defined benchmark.

Figure 7:
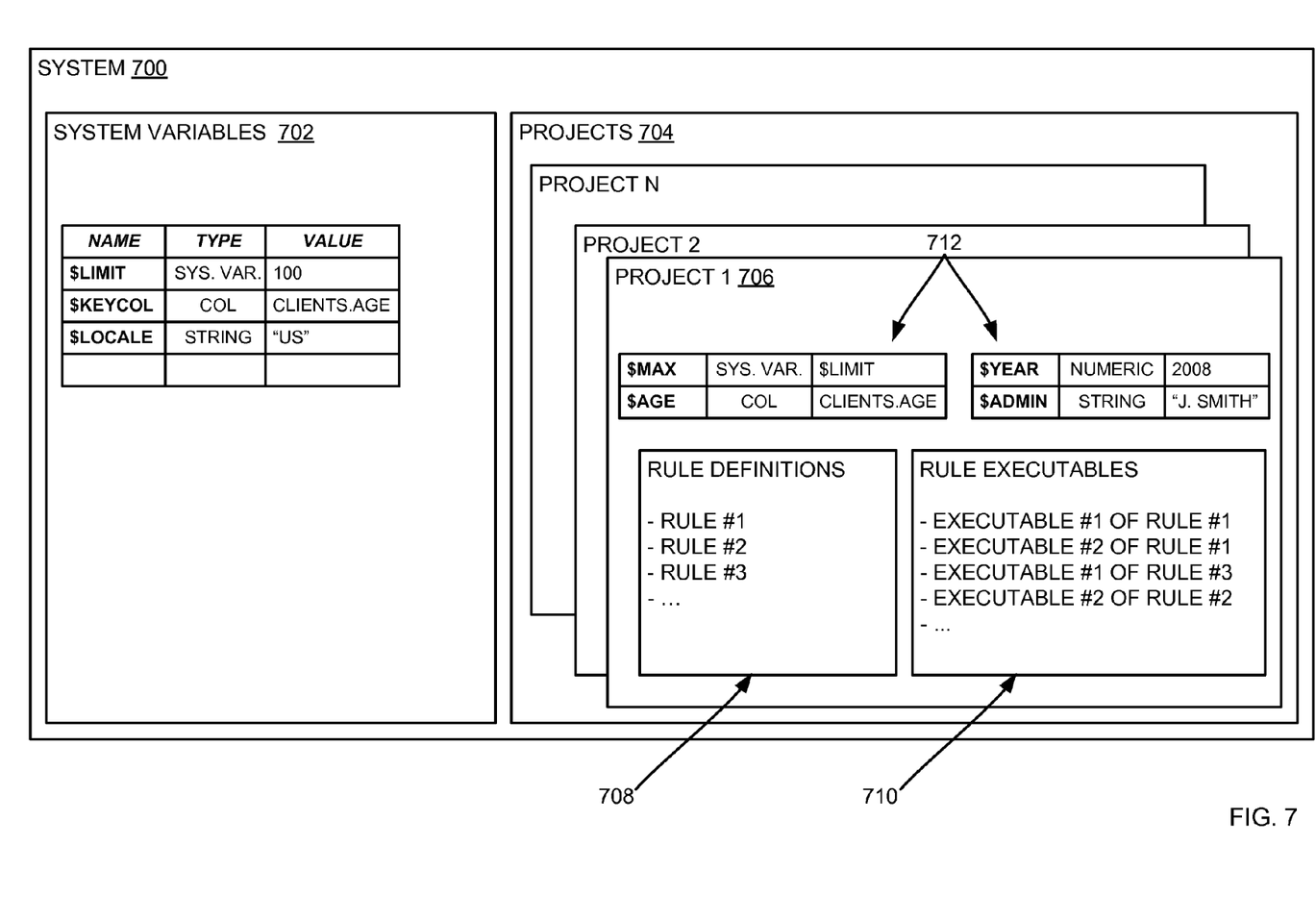
FIG. 7 is an illustrative representation of a system for creating and managing portable data in accordance with embodiments of the present invention.

FIG. 7 is an illustrative representation of a system 700 for creating and managing portable data in accordance with embodiments of the present invention. As illustrated, system 700 may include one or more projects 704. Project 1 (706), for example, may include a list of rule definitions 708 having any number of rule definitions. Project 1 (706) may further include a list of rule executables 710 having any number of rule executables. In addition, Project 1 (706) may include logical variables 712 which may be bound as described above. Further system 700 may provide system variables 702, which may be used as binding for logical variables in executables or as binding for a project variable. It may be appreciated that system and project variables represent one method for managing centrally located bindings which may be utilized in different places. Thus, instead of having to modify the bindings of several executables when a physical source changes, a user can simply bind logical variables of the executables to system or project variables and subsequently bind the system or project variables to the physical source. When a source changes, only the binding of the system or project variables need to change. As such bindings of the executables can remain unchanged.

Figure 8:
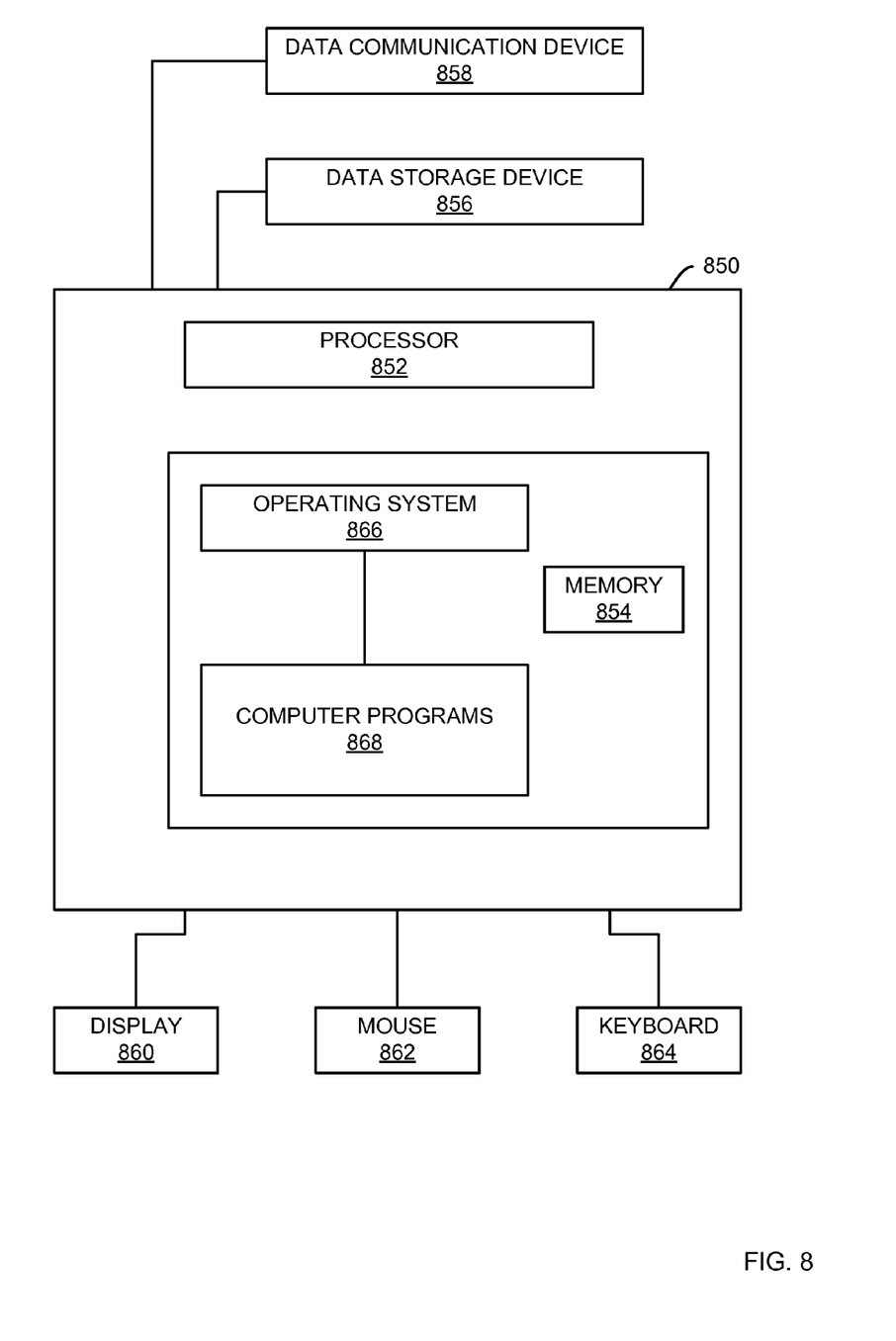
FIG. 8 is an illustrative representation of a hardware environment in accordance with embodiments of the present invention.

FIG. 8 is an illustrative representation of a hardware environment in accordance with embodiments of the present invention. In embodiments, architecture 100 (see FIG. 1) may be practiced utilizing hardware environments provided herein. As illustrated in FIG. 8, the preferred embodiment of the present invention is implemented in a computer 850. The computer 850 generally includes a processor 852, a memory 854 such as a random access memory (RAM), a data storage device 856 (e.g., hard drive, floppy disk drive, CD-ROM disk drive, etc.), a data communication device 858 (e.g., a modem, network interface device, etc.), a display 860 (e.g., CRT, LCD display, etc.), a pointing device 862 (e.g., a mouse, a track ball, a pad or any other device responsive to touch, etc.) and a keyboard 864. It is envisioned that attached to the computer 850 may be other devices such as read only memory (ROM), a video card drive, printers, peripheral devices including local and wide area network interface devices, etc. One of ordinary skill in the art will recognize that any combination of the above components may be used to configure the computer 850.

The computer 850 operates under the control of an operating system ("OS") 866, such as MVS™, AIX®, UNIX®, OS/2®, WINDOWS™, WINDOWS NT™, etc., which typically is loaded into the memory 854 during the computer 850 start up (boot-up) sequence after power-on or reset. (AIX and OS/2 are registered trademarks and MVS is a trademark of International Business Machines Corporation in the United States, other countries, or both. Windows and Windows NT are trademarks of Microsoft Corporation. UNIX is a registered trademark in the United States and/or other countries licensed exclusively through X/Open Company Limited.) In operation, the OS 866 controls the execution by the computer 850 of computer programs 868, including computer programs.

Alternatively, a method, system, or computer readable medium in accordance with the present invention may be implemented with any one or all of the computer programs 868 embedded in the OS 866 itself without departing from the scope of the invention. Preferably, however, the client programs are separate from the computer programs. The OS 866 and the computer programs 868 each comprise computer readable instructions which, in general, are tangibly embodied in or are readable from a media such as the memory 854, the data storage device 856 and/or the data communications device 858. When executed by the computer 850, the instructions cause the computer 580 to perform the steps necessary to implement the present invention. Thus, the present invention may be implemented as a method, system, or computer readable medium using programming and/or engineering techniques to produce software, hardware, firmware, or any combination hereof In accordance with the present invention, various embodiments for a window docking are presented that allow for feedback of the configurations displayed on a graphical user interface of the computer 850. Such a graphical user interface in a computer system may be implemented via conventional programming techniques.

While this invention has been described in terms of several embodiments, there are alterations, permutations, and equivalents, which fall within the scope of this invention. It should also be noted that there are many alternative ways of implementing the methods, systems, and computer program products of the present invention. Furthermore, unless explicitly stated, any embodiments described herein are not constrained to a particular order or sequence. Further, the Abstract is provided herein for convenience and should not be employed to construe or limit the overall invention, which is expressed in the claims. It is, therefore, intended that the following appended claims be interpreted as including all such alterations, permutations, and equivalents as fall within the true spirit and scope of the present invention.

What is claimed is:

1. A system for defining and managing a plurality of portable data rules comprising:

a user interface for managing I/O functions of the system, the user interface including a rule editor, wherein the rule editor is configured for defining a plurality of rule definitions each including at least one logical variable;

a rule repository for storing the plurality of rule definitions;

a data processing engine in electronic communication with the user interface and the rule repository for generating and executing a rule executable, wherein the rule executable is one of the plurality of portable data rules and includes a binding target for the at least one logical variable of a corresponding rule definition, and wherein at least two rule executables provide different bindings for the same rule definition; and a data store in electronic communication with the data processing engine for storing data upon which the rule executable operates.

2. The system of claim 1, wherein the plurality of rule definitions comprises:

an expression for each of the plurality of rule definitions, wherein the expression defines a logic of a rule, wherein the logic of the rule includes the at least one logical variable; and a logical variable list, wherein the logical variable list includes, a name of the at least one logical variable, and an expected type of the at least one logical variable.

3. The system of claim 2, wherein the logical variable list further comprises a default binding target of the at least one logical variable.

4. The system of claim 2, wherein the rule executable comprises:

a reference to at least one of the plurality of rule definitions;

a binding list, wherein the binding list includes, the name of the at least one logical variable, a type of the at least one logical variable, and the binding target for the at least one logical variable.

5. The system of claim 4, wherein the rule executable further comprises:

an output specification for determining how an output is presented;

a join condition for presenting how the binding target is utilized to join a plurality of tables during an executing of the rule executable;

runtime settings for determining how the rule executable will access the data store; and an execution history for logging statistics of the executing of the rule executable.

6. The system of claim 5, wherein the statistics are selected from the group consisting of: a run number, a run start date, a run start time, a run row information, a run row pass percentage, a run ID, a user name, a run duration, a total number of analyzed rows, a variance to a predefined benchmark, a rule set record pass percentage, a rule set row pass percentage, a rule set standard deviation, a rule set row per rule pass percentage, a rule set row rule fail rate, and a rule set row detail result.

7. The system of claim 1, wherein the binding target is selected from the group consisting of: a physical column, a physical table, a constant, a project variable, and a system variable.

8. The system of claim 2, wherein the expression is selected from the group consisting of: a logical expression, a model, and a matrix.

9. The system of claim 2, further comprising a rule set, the rule set including:

at least two of the plurality of rule definitions;

a public logical variable list, wherein the public logical variable list includes, a public logical variable name of the at least one logical variable corresponding with the at least two of the plurality of rule definitions, wherein the public logical variable name corresponds with a public logical variable, and wherein the public logical variable is internally bound with the at least one logical variable, and an expected public type of the at least one logical variable corresponding with the at least two of the plurality of rule definitions.

10. The system of claim 9, wherein the public logical variable list further comprises a public default binding target for each of the at least one logical variable.

11. A computing device program product for creating and managing a portable data rule using a computing device, the computing device program product comprising:

a computer readable storage medium;

first programmatic instructions for creating a rule definition including, second programmatic instructions for defining an expression by a user, wherein the expression defines a logic of a rule and includes at least one logical variable, third programmatic instructions for storing the rule definition, wherein the rule definition includes at least the expression and the at least one logical variable, and fourth programmatic instructions for generating and executing a rule executable, wherein the rule executable is a portable data rule and includes a binding target for the at least one logical variable, and wherein at least two rule executables provide different bindings for the same rule definition;

wherein the programmatic instructions are stored on the computer readable storage medium.

12. The computing device program product of claim 11, wherein the fourth programmatic instructions further comprise:

fifth programmatic instructions for selecting a stored rule definition;

sixth programmatic instructions for extracting the at least one logical variable associated with the expression;

seventh programmatic instructions for binding the at least one logical variable with the binding target;

eighth programmatic instructions for generating the rule executable, wherein the rule executable is a physical implementation of the rule definition; and ninth programmatic instructions for executing the rule executable.

13. The computing device program product of claim 11, wherein the fourth programmatic instructions comprise:

tenth programmatic instructions for returning a name of the at least one logical variable;

eleventh programmatic instructions for returning an expected type of the at least one logical variable; and twelfth programmatic instructions for returning a default binding target.

14. The computing device program product of claim 11, wherein the rule executable comprises:

a reference to at least one rule definition;

a binding list, wherein the binding list includes, a name of the at least one logical variable, a type of the at least one logical variable, and the binding target for the at least one logical variable.

15. The computing device program product of claim 14, wherein the rule executable further comprises:

an output specification for determining how an output is presented;

a join condition for presenting how the binding target is utilized to join a table during the executing of the rule executable;

runtime settings for determining how the rule executable will access a data store; and an execution history for logging statistics of the executing of the rule executable.

16. The computing device program product of claim 15, wherein the statistics are selected from the group consisting of a run number, a run start date, a run start time, a run row information, a run row pass percentage, a run ID, a user name, a run duration, a total number of analyzed rows, a variance to a predefined benchmark, a rule set record pass percentage, a rule set row pass percentage, a rule set standard deviation, a rule set row per rule pass percentage, a rule set row rule fail rate, and a rule set row detail result.

17. The computing device program product of claim 11, wherein the binding target is selected from the group consisting of a physical column, a physical table, a constant, a project variable, and a system variable.

18. The computing device program product of claim 11, wherein the expression is selected from the group consisting of: a logical expression, a model, and a matrix.

19. The computing device program product of claim 11, further comprising:

fifth programmatic instructions for creating a rule set, the rule set including:

at least two rule definitions;

a public logical variable list, wherein the public logical variable list includes, a public logical variable name of the at least one logical variable corresponding with the at least two rule definitions, wherein the public logical variable name corresponds with a public logical variable, and wherein the public logical variable is internally bound with the at least one logical variable, and an expected public type of the at least one logical variable corresponding with the at least two rule definitions.

20. The computing device program product of claim 19, wherein the public logical variable list further comprises a public default binding target for each of the at least one logical variable.

* * * * *